United States Patent [19]

Mitchell et al.

[11] Patent Number: 5,354,588
[45] Date of Patent: Oct. 11, 1994

[54] LINERLESS LABELS WITH TIE COAT

[75] Inventors: Nancy G. Mitchell, Grand Island; Joseph W. Langan, Cheektowaga; Adele C. Shipston, Williamsville; Timothy J. Russ, Niagara Falls; Douglas M. Smith, Buffalo, all of N.Y.

[73] Assignee: Moore Business Forms, Inc., Grand Island, N.Y.

[21] Appl. No.: 912,851

[22] Filed: Jul. 13, 1992

[51] Int. Cl.$^5$ .................... A61F 13/02; B32B 7/12
[52] U.S. Cl. ................... 428/40; 428/352; 428/358; 428/354
[58] Field of Search .......... 428/353, 352, 42, 354, 428/511, 40

[56] References Cited

U.S. PATENT DOCUMENTS

| 2,845,728 | 8/1958 | Huber | 40/2 |
| 3,051,588 | 8/1962 | Lavanchy | 117/68.5 |
| 3,282,727 | 11/1966 | Crone et al. | 117/68.5 |
| 3,285,171 | 11/1966 | Darbroski | 117/68.5 |
| 3,575,788 | 4/1971 | Funk et al. | 161/167 |
| 3,855,052 | 12/1974 | Mestetsky | 428/352 |
| 4,056,661 | 11/1977 | Sato et al. | 428/354 X |
| 4,117,198 | 9/1978 | Power et al. | 428/511 |
| 4,241,142 | 12/1980 | Kaliski et al. | 428/511 |
| 4,578,302 | 3/1986 | Schmidt, Jr. et al. | 428/511 |
| 4,851,383 | 7/1989 | Fickenscher et al. | 503/200 |
| 4,882,211 | 11/1989 | McIntyre et al. | 428/40 |
| 4,927,689 | 5/1990 | Markiewicz | 428/353 X |
| 4,948,663 | 8/1990 | Hürter et al. | 428/353 |
| 5,135,798 | 8/1992 | Muschter et al. | 428/353 X |
| 5,209,959 | 5/1993 | McNaul et al. | 428/354 |

FOREIGN PATENT DOCUMENTS

| 1220764 | 4/1987 | Canada . |
| 1248412 | 1/1989 | Canada . |
| 2016889 | 11/1990 | Canada . |
| 0096841 | 12/1983 | European Pat. Off. . |
| 081963 | 3/1988 | European Pat. Off. . |
| 387916 | 9/1990 | European Pat. Off. . |
| 0475592 | 3/1992 | European Pat. Off. . |
| 2489352 | 3/1982 | France . |
| 60-233181 | 11/1985 | Japan . |
| 60-121198 | 12/1985 | Japan . |
| 4-027503 | 12/1991 | Japan . |
| 3273079 | 12/1991 | Japan . |
| 554019 | 6/1943 | United Kingdom . |
| 2013613 | 8/1979 | United Kingdom . |

OTHER PUBLICATIONS

"Handbook of Pressure–Sensitive Adhesive Technology", Satas, Van Nostrand Reinhold Company, 1983, pp. 189–193, 216–221, 276–281, 300–305, 332–333, 370–379, 384–399, 404–407, 410, 411.

"In–Line Converting UV Silicone and Hot Melt Combined For General Purpose Tapes and Labels", McIntyre, Adhesives Age, Nov., 1983, pp. 31–33.

Primary Examiner—George F. Lesmes
Assistant Examiner—B. Copenheaver
Attorney, Agent, or Firm—Nixon & Vanderhye

[57] ABSTRACT

Linerless label stock is produced from a single substrate utilizing a coating machine by moving the substrate through the coating machine and applying a tie coating to the substrate first face, a release coating to the substrate second face, and a pressure sensitive adhesive to the tie coating. The tie coating comprises a dispersion of a pigment, such as silica, with a binder, such as polyvinyl alcohol. The substrate is cut to form individual labels, and is rolled up into a roll with the release coated second face on the outside of the roll. Printing may be applied to the substrate prior to coating, or to the release coating.

3 Claims, 1 Drawing Sheet

LINERLESS LABELS WITH TIE COAT

BACKGROUND AND SUMMARY OF THE INVENTION

Linerless labels, such as shown in U.S. Pat. Nos. 3,051,588, 3,285,771, and 4,851,383, and in Canadian patent 1,248,412, are known to have advantages over conventional pressure sensitive labels which are mounted on a liner which has been coated with a release coating. In the conventional labels the liner acts as a support for transport, printing and storage, and after the label is removed from the liner it must be disposed of. A linerless label, on the other hand has the face coated with a release coating, and the back with a pressure sensitive adhesive (PSA), and is wound in a roll configuration so that the PSA is in contact with the release coating, and the release coating faces outwardly. The linerless construction offers advantages and lower costs due to substantial material reduction, elimination of disposal concerns and costs associated with release coated liners, and in providing approximately twice as many labels per roll.

While linerless labels have numerous advantages, they have not had widespread commercial acceptance, perhaps due in part to impediments to easy and clean peeling off of the PSA from the release coating in the roll format. If the adhesion of the PSA to the substrate is not strong enough (and this adhesion can degrade over time under some environmental conditions and materials), adhesive may stick to the release coating, or the substrate may be torn.

According to the present invention, a linerless label stock, and a method of making linerless labels, are provided which enhance the viability of linerless labels by providing a more secure adhesion of the PSA to the substrate than is typically provided in the prior art. According to the present invention a tie coat is provided which facilitates adherence of the PSA to a first face (the "back") of the substrate, the tie coat adhering to both the substrate first face and the PSA. The tie coat preferably comprises a dispersion of a pigment, such as silica, with a binder, such as PVA. For example, the tie coat may consist essentially of about 30–40 parts silica dispersion, about 20–35 parts PVA, and about 30–40 water. Printing may be provided on the substrate first face, or may be applied onto the release coating by certain techniques.

According to the method of making linerless labels of the invention, a coating machine is utilized with a substrate having first and second faces. The method comprises the steps of: (a) Continuously moving the substrate in a first direction through the coating machine, and substantially sequentially: (b) With the coating machine, applying in a predetermined sequence to the moving substrate a tie coating to the substrate first face, a release coating to the substrate second face, and a pressure sensitive adhesive to the tie coating. (c) Cutting the substrate to form individual labels. And, (d) rolling the substrate into a roll, with the release coated second face on the outside of the roll.

In the practice of the method set forth above, the predetermined sequence of step (b) is preferably to apply the tie coating first, then the release coating, and then the pressure sensitive adhesive. The cutting step may be die cutting, and drying at a rate much faster than ambient air drying may be practiced before steps (c) and (d), by hot air, infrared, or like drying technique.

It is the primary object of the present invention to provide an advantageous linerless label stock, and a simple yet effective method for making the stock. This and other objects of the invention will become clear from an inspection of the detailed description of the invention and from the appended claims.

DETAILED DESCRIPTION OF THE DRAWINGS

Figure 1:
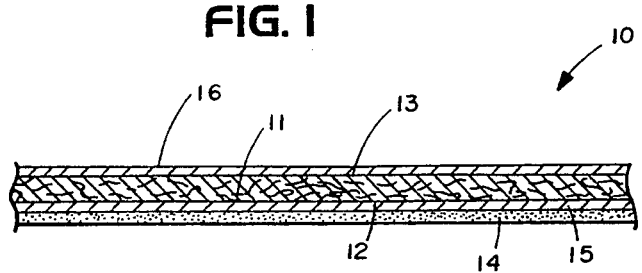
FIG. 1 is a cross-sectional view of exemplary linerless label stock according to the present invention showing each of the layers (with greatly exaggerated thickness)

An exemplary section of linerless label stock is shown generally by reference numeral 10 in FIG. 1. The stock 10 according to the invention comprises a substrate 11 having a first face 12 and a second face 13. The substrate may be any conventional substrate used in label applications, such as bond paper, latex-impregnated paper, vinyl, or polyester. The substrate is not a thermally sensitive one.

Associated with the substrate 11 is a coating of pressure sensitive adhesive 14. The PSA may comprise any conventional formulation used in pressure sensitive adhesive applications, including solvent-base, water-base, hot melt or radiation curable formulations- Typical adhesive formulations are listed in the "Handbook of Pressure-Sensitive Technology" by Donatas Satas, Van Nostrand Reinhold Company, 1983. Particularly desirable PSA comprises a water-based acrylic adhesive prepared by free radical polymerization of acrylic monomers (either a homopolymer or a copolymer). For example the polymer may be made 70–100% of a soft monomer such as 2-ethylhexyl acrylate, 0–6% of functional monomer such as acrylic acid, and 0 to 30% of a hard monomer such a vinyl acetate.

According to the invention, adherence of the PSA 14 to the substrate 11 first face 12 is provided by a tie coating 15. The tie coating 15 adheres to both the PSA and the substrate 11. It may comprise, or consist essentially of, a dispersion of a pigment, preferably silica, with a binder material, such as polyvinyl alcohol (PVA). For example the tie coating may comprise or consist essentially of about 30–40 parts silica dispersion, about 20–35 parts PVA, and 30–40 parts water.

On the second face 13 of the substrate 11, which may have printing thereon (see FIG. 3), a release coat 16 is provided. The release coating 16 is of any suitable material that imparts a lower surface energy to the face 13, and has properties with respect to the PSA 14 so that it will release easily from the PSA 14; that is the PSA 14 will not stick to the release coating 16, while it has great affinity for the tie coating 15. Typical release coatings are listed in chapters 17 and 18 of the Handbook of Pressure-Sensitive Adhesive Technology by Satas, referenced above. Preferred formulations include silicone resins and chrome complexes of fatty acids.

Figure 2:
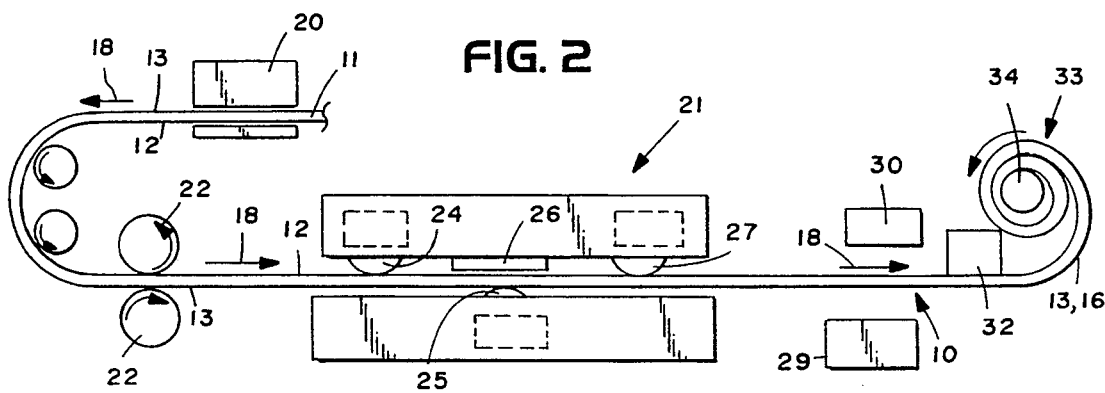
FIG. 2 is a side schematic view showing exemplary apparatus for practicing an exemplary method of producing linerless labels according to the present invention.

FIG. 2 illustrates exemplary apparatus for producing linerless labels according to an exemplary method of the present invention. The substrate 11 is continuously moved in the direction of arrows 18. Printing may be applied to the second face 13, as with the conventional printer 20, which may be located prior to a coating machine 21, and drives for the substrate 11 may be any conventional driving means, such as drive rollers 22.

In the single, conventional coating machine 21, all three of the coatings 14–16 are provided. For example a first roller or like applicator 24 applies the tie coating 15 to the first face 12, while shortly thereafter a second roller or applicator 25 applies the release coating 16 to the second face 13. A dryer 26, for effecting drying of the tie coating 15 much more quickly than by ambient air (e.g. a hot air dryer) so that the tie coat is dry by the time it reaches the third roller or other applicator 27, which applies the pressure sensitive adhesive 14 over the tie coat 15, on the face 12, is also provided. The preferred location of the printer 20 is after the dryer 26 but before the second applicator 27.

Drying of the PSA 14 and/or the release coat 16 may be provided by dryers 29, 30 downstream of the coating machine 21 in the direction of arrows 18, and after drying by the dryers 29, 30 (which effect drying much quicker than ambient air, and may be hot air, infrared, or like conventional dryers depending upon the particular coatings); and after the stock 10 is dried, it is cut into labels by a conventional cutter 32. Then the stock is taken up in roll format 33 by take up mechanism 34, with the release coating 16 and second face 13 on the outside of the roll 33 that is being taken up, with the PSA 14 in contact with the release coating 16 in the spiral configuration of the roll 33.

Printing can also be performed (not shown) on the release coat 16 (e.g. a hot melt ink, ink jet printer).

The labels can be formed from a web which, just prior to take up 34, is slit into the rolls 33, or the rolls 33 can be formed later, after take up.

Figure 4:
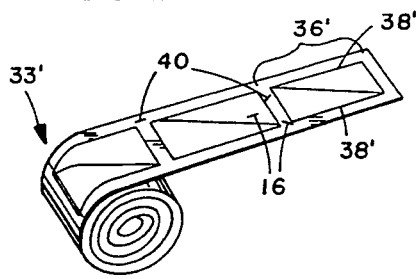
FIGS. 3 and 4 are perspective views of exemplary rolls of linerless label stock of FIG. 1, produced utilizing the apparatus in FIG. 2.
Figure 3:
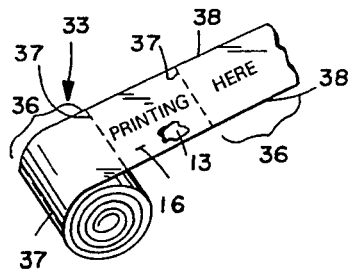

FIGS. 3 and 4 illustrate two different constructions of rolls of linerless label. The roll 33 of FIG. 3 has individual labels 36 thereof which have been cut, with less than complete severing (e.g. by very fine perforations, or die cuts, indicated by cut lines 37 in FIG. 3), generally transverse to the direction of elongation of the substrate 11 of the roll 33, with the sides 38 of each label corresponding to the sides of the substrate 11. Each label 36 has a width and length typically less than one foot. In this construction there is no waste whatsoever but rather each label 36 is merely detached along a line 37 from the next quadrate label 36 in sequence.

FIG. 4 illustrates a modified form of a roll 33' of linerless labels according to the invention. In this embodiment, the cutter 32 effects complete die cutting of individual labels 36' out of the substrate, so that the edges 38' thereof do not correspond to the side edges of the substrate. The labels 36' may have any shape (they need not be quadrate), but in this embodiment there is some waste material provided by the skeletal structure 40 of the substrate outside of the labels 36'.

The invention having been described in general terms, one specific example of a linerless label producible according to the invention is as follows:

EXAMPLE

A tie coat 15 was prepared according to the following formulation:

36 parts—20% Cab-O-Sperse II dispersion, Cabot Corp.
28 parts—10% Polyvinyl Alcohol, Air Products & Chemicals (Partially Hydrolyzed)
36 parts—Water PSA 14 was prepared according to the following formulation:

51.2 parts—2% PVA 523, Air Products & Chemicals
48.7 parts—2-ethylhexyl acrylate (monomer) BASF
0.002 parts—Benzoyl Peroxide (BPO), Lucidol division of Pennwalt A release coating 16 was prepared according to the following formulation:

15 parts—Quilon C, Valcon
85 parts—Water

The tie coat 15 was applied to first face 12 with the applicator 24, the release coat 16 was applied to face 13 with the applicator 25, the tie coat was dried by the dryer 26, the PSA was applied over the tie coat 15 with the applicator 27, and the entire stock 10 was dried by dryers 29, 30, and after cutting into labels 32 was self-wound in roll form 33 by winder 34.

It will thus be seen that according to the present invention linerless label stock, and a method of production thereof, have been provided which in a simple yet effective way provide easy to use labels, with no or little waste. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent products and processes.

What is claimed is:

1. Linerless label stock, comprising:
a substrate having first and second faces;
a pressure sensitive adhesive;
a tie coat facilitating adherence of said pressure sensitive adhesive to said first face of said substrate, said tie coat adhering to both said substrate first face and said pressure sensitive adhesive; and
a release coat, of material that has a low adherence to said pressure sensitive adhesive, on said second face of said substrate, wherein said tie coating consists essentially of about 30–40 parts silica dispersion, about 20–35 parts polyvinyl alcohol, and about 30–40 parts water.

2. Linerless label stock, comprising:
a substrate having first and second faces;
a pressure sensitive adhesive;
a tie coat facilitating adherence of said pressure sensitive adhesive to said first face of said substrate, said tie coat adhering to both said substrate first face and said pressure sensitive adhesive; and
a release coat, of material that has a low adherence to said pressure sensitive adhesive, on said second face of said substrate,
wherein said tie coating comprises a dispersion of a pigment with a binder, and
wherein said tie coating consists essentially of about 30–40 parts silica dispersion, about 20–35 parts polyvinyl alcohol, and about 30–40 parts water.

3. Linerless label stock, comprising:
a substrate having first and second faces;
a pressure sensitive adhesive;
a tie coat enhancing adherence of said pressure sensitive adhesive to said first face of said substrate, said tie coat adhering to both said substrate first face and said pressure sensitive adhesive;

a release coat, of material that has a low adherence to said pressure sensitive adhesive, in continuous form over said second face of said substrate, to prevent the pressure sensitive adhesive from sticking to the second face of the substrate if brought into contact therewith, wherein said tie coating consists essentially of about 30–40 parts silica dispersion, about 20–35 parts polyvinyl alcohol, and about 30–40 parts water.

* * * * *